June 5, 1962   G. SONNEFELD   3,037,345
GAS TURBINE SYSTEM WITH FEEDBACK CYCLE
Filed May 6, 1957   4 Sheets-Sheet 1
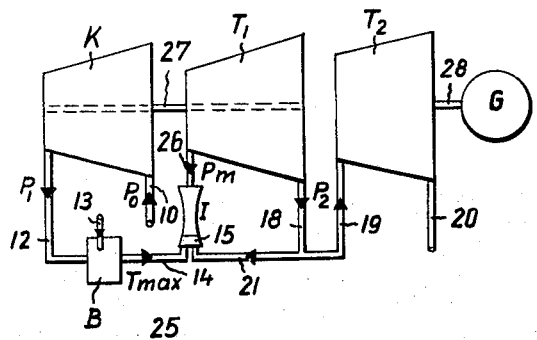
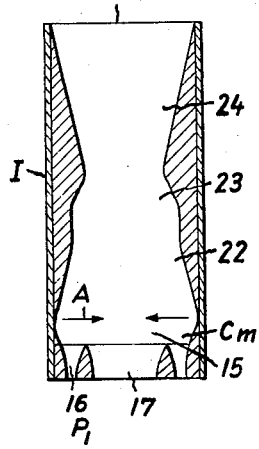
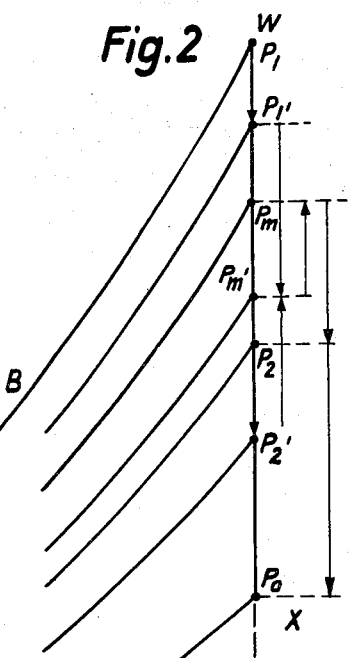
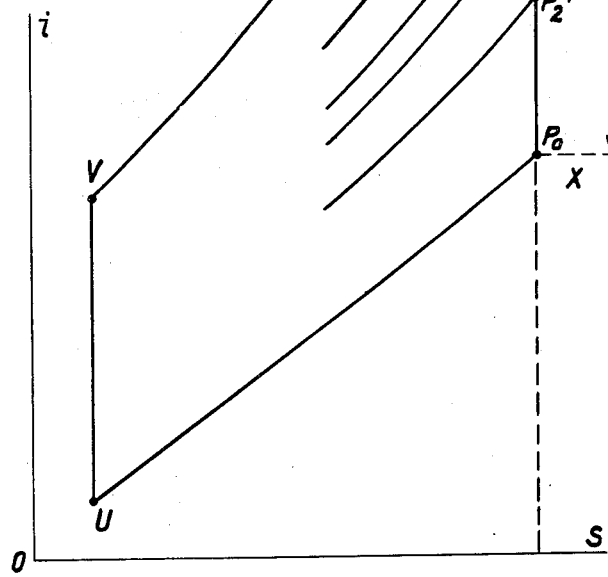
Inventor:
GEORG SONNEFELD
By Taulmin & Taulmin
Attorneys June 5, 1962 G. SONNEFELD 3,037,345
GAS TURBINE SYSTEM WITH FEEDBACK CYCLE
Filed May 6, 1957 4 Sheets-Sheet 2

Inventor:
GEORG SONNEFELD
By Taulmin & Taulmin
Attorneys

June 5, 1962 G. SONNEFELD 3,037,345
GAS TURBINE SYSTEM WITH FEEDBACK CYCLE
Filed May 6, 1957 4 Sheets-Sheet 3
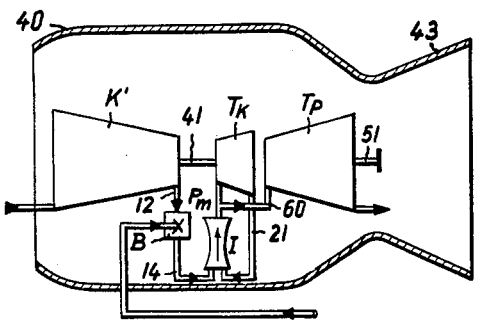
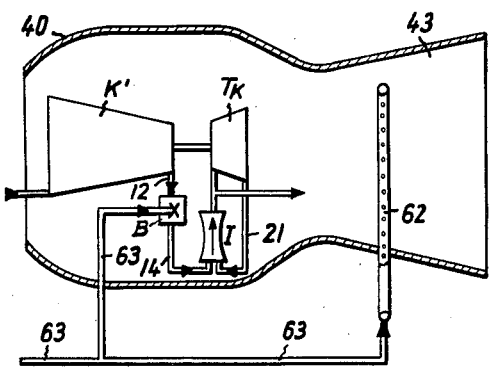
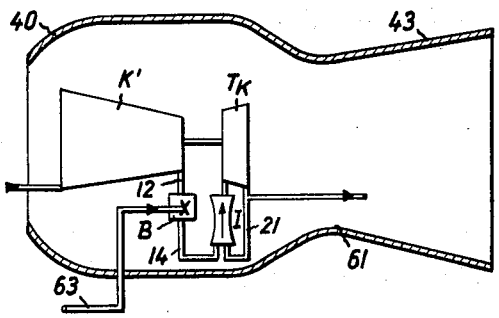
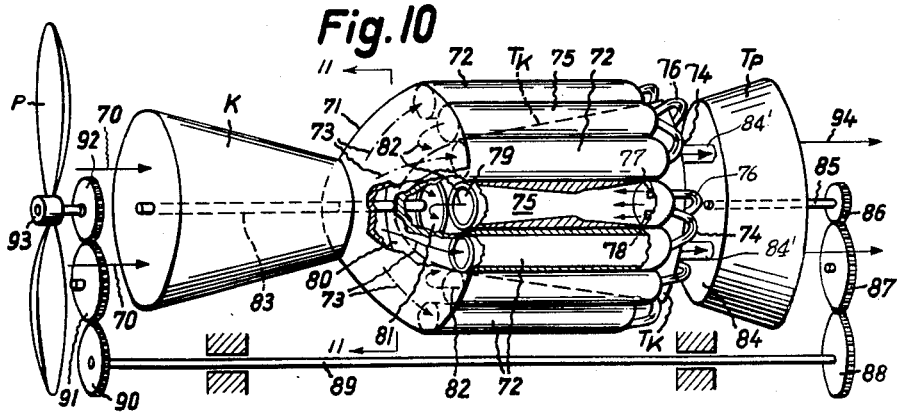
Inventor:
GEORG SONNEFELD
By Taulmin & Taulmin
Attorneys June 5, 1962  G. SONNEFELD  3,037,345
GAS TURBINE SYSTEM WITH FEEDBACK CYCLE
Filed May 6, 1957  4 Sheets-Sheet 4

Inventor:
GEORG SONNEFELD
By Taulmin & Taulmin
Attorneys

United States Patent Office 3,037,345
Patented June 5, 1962

3,037,345
GAS TURBINE SYSTEM WITH FEEDBACK CYCLE
Georg Sonnefeld, Karlsbader Strasse 16, Frankfurt am Main, Germany
Filed May 6, 1957, Ser. No. 657,272
Claims priority, application Germany May 7, 1956
3 Claims. (Cl. 60—35.6)

This invention relates to a gas turbine system and in particular to such gas turbine systems in which the total enthalpy difference is subdivided into several stages.

The invention relates still more particularly to gas turbine systems for use in aircraft propulsion.

It is an object of the invention to provide a gas turbine system which permits to achieve, with the presently available construction materials, a substantially higher degree of efficiency than the known systems.

It is another object of the invention to provide a gas turbine system which permits to exploit the maximum temperatures supported by the presently available gas turbine construction materials and simultaneously to limit the gas temperature at the turbine entrance to values which can be supported by presently available materials for the construction of the turbine blades.

It is a further object of the invention to provide a gas turbine system in which the turbine stage comprising maximum temperatures and pressures in the known systems can be replaced by means made of the presently available materials, which means support even higher temperatures than the aforesaid high temperature turbine stage.

The efficiency of the thermo-dynamic process taking place in gas turbine systems depends not only on the dimensions and the actual output of the individual elements forming the gas turbine system, but also on the level of the maximum temperature of the working medium in the process. In most known gas turbine systems, this maximum temperature is identical with the temperature of the gases at the entrance of the turbine. This constitutes a limitation for the maximum temperature and a corresponding upper limit for the attainable efficiency of the process, which limit is set primarily by the capability of the materials for the construction of the turbine to withstand high temperatures.

This temperature limit is in the order of maximally 650 to 700° C. which corresponds to maximum gas temperatures of 800° C. Many efforts have been made to raise this temperature limit, which efforts have been concentrated on cooling the turbine system and the rotating parts thereof. The required cooling air is generally derived from a compressor which is provided in these gas turbine systems to compress the working medium. Consequently, the air used for cooling requires additional compression energy and causes a decrease of efficiency of the process.

It is also known to cool the turbine blading with liquid coolant. This requires hollow blades or similar complicated structural arrangements in particular of feed and outlet conduits to the rotary parts of the turbine. The heat dissipated by this cooling method again constitutes a loss of energy in the process. In another known construction described, for instance, in the German Patent No. 909,268 to Ernst Schmidt, granted on 13th of Feb., 1942, water is evaporated in channels of the rotor blades. Thereby, the turbine system is converted from a pure gas turbine to a combination of a gas and steam turbine. This system requires a very complicated construction and operation in particular since it requires an absolutely pure feed water. Otherwise, the narrow blade channels become clogged and are very difficult to clean. Other drawbacks are caused by a complicated arrangement required for the shafts which must be internally heated by pre-heated feed water and steam, as well as the glands or stuffing boxes pertaining thereto. These known efforts reveal that an increase of the maximum temperature in the process has, in the past, been accompanied by increasingly complicated construction of the gas turbine system. Other efforts were directed to the replacement of metal blades used in the range of highest temperatures, by blades which are built from ceramic or similar sintered materials. However, such efforts have had no satisfactory results, because blades of ceramic and the like materials do not withstand, up to the present, the centrifugal forces, vibrations, shocks and the like mechanical stresses occurring in gas turbines. Such materials have only been successfully used in nozzle constructions.

It has also been disclosed in the German Patent 870,781 issued on March 16, 1953 to W. P. Kritzler to subdivide the total enthalpy difference in a gas turbine system into several stages, for instance a high pressure stage, a medium pressure stage and a low pressure stage and to replace the turbine in the high pressure stage for bringing a partial quantity of gas from the medium stage to the entrance pressure of the medium stage and to a temperature below the maximum temperature of the high pressure stage. However, the efficiency of this known system is unsatisfactory due to the well known low efficiency of the injector, which is only in the order of 30%.

The above mentioned objects are attained and the various drawbacks of the known systems described hereinbefore are avoided by the gas turbine system according to the invention which comprises, in combination, a compressor, a medium pressure stage turbine, and a combustion chamber as well as, in the high pressure stage of the system, a pressure equalizing nozzle of the type described in my copending patent application Serial No. 652,187 filed April 11, 1957.

Preferably, the medium pressure stage turbine is used for driving the compressor.

In this aforesaid pressure equalizing device, the gas masses from the high pressure stage and from the medium pressure stage are first accelerated to the same velocity, which velocity must be supercritical, i.e. supersonic, for at least one of the two gas media. This must be always at least the gas medium having the lower pressure.

As is well known, the critical velocity, i.e. the velocity of sound is greater in media of higher pressure.

It is also possible to combine more than two gas currents of different pressures to form a jet having a common mean pressure. However, in doing so in the pressure equalizing jet nozzle according to my invention, it is necessary that at least all but one or possibly all of the individual gas flows attain supercritical velocities in the interior of the nozzle prior to the combining stage of the flows to form the jet.

Thereby, the equalization of both gas currents is effected while maintaining the total entropy of the combined flow of gases substantially constant. More in detail, the gas flows from the high pressure stage, in which the gas medium has a maximum temperature, and from the medium pressure stage, the gas medium in which is of a lower temperature than in the first stage, are accelerated, as a first step to attain the aforesaid common velocity, whereupon, as a second step, pressure equalization in a direction transverse to the direction of the flow of the gases takes place in an equalization chamber. This equalization chamber is so shaped that its cross section area decreases in the direction of gas flow toward a smallest value, whereby the equalization work is converted into pressure while the axial velocity of both gas currents remains constant from the entrance till the exit of the equalization chamber. As a third step, the kinetic energy of the combined total gas mass is converted into pressure to supply, in subsequently arranged diffusor means, the starting pressure required for introduction into the turbine of the medium stage.

In the high temperature and high pressure range, the conventional turbine is thus eliminated. The enthalpy drop in this high pressure stage is utilized for effecting a compression in the aforementioned cycle of the second gas flow from the exit of the medium stage turbine back to the entrance thereof. The ratio of the expanded gas mass to the compressed gas mass in the pressure equalizing nozzle is invertedly proportioned to the ratio of the expansion enthalpy difference to the compression enthalpy difference according to the formula $$\frac{\Delta i_e}{\Delta i_c} = \frac{G_c}{G_e}$$

in which $\Delta i_e$ is the enthalpy difference and $G_e$ the gas mass of the primary cycle in which the high pressure gas from the combustion chamber is expanded in the pressure equalizing device, while $\Delta i_c$ is the enthalpy difference and $G_c$ is the gas mass of the work medium in the secondary cycle which gas is compressed in the same pressure equalizing device. The resulting common mean pressure is the entrance pressure to the medium stage gas turbine. The portion of the latter gas turbine which is connected in parallel to the compression in the pressure equalizing device is charged firstly with the gas mass from the aforesaid secondary cycle and additionally with the gas mass passing through a primary cycle which passes through the aforesaid compressor and the combustion chamber and is then expanded in the pressure equalizing device. This primary cycle is preferably an open cycle in which the work medium, for instance air from the outside, is raised to the maximum pressure of the entire process by means of the aforesaid compressor. The ratio between the entrance pressure and the exit pressure of the medium stage turbine is smaller than the ratio of the exit pressure to the entrance pressure of the compressor.

The present invention will be better understood by the following detailed description of the accompanying drawings, wherein FIGURE 1 shows schematically the basic embodiment of the gas turbine system according to the invention;

FIGURE 1a is a cross-section of a jet nozzle incorporated in a gas turbine system according to the invention;

FIGURE 2 is a graphic view of the thermodynamic process in the gas turbine system according to the invention represented in enthalpy-entropy ($i$—$s$)-diagram;

FIGURE 7 illustrates schematically yet another embodiment of the gas turbine system according to the invention used in the same manner as illustrated in FIGURE 5;

FIGURE 8 illustrates the gas turbine system according to the invention as illustrated in FIGURE 5 adapted for use in the turbo-jet-propelled aircraft;

FIGURE 9 illustrates the gas turbine system according to the invention as illustrated in FIGURE 7 and adapted for use in a turbo-jet-propelled aircraft.

FIGURE 10 illustrates in perspective and partially sectional view a gas turbine system according to the invention comprising a plurality of pressure equalizing devices and combustion chambers arranged in parallel and used with a propeller driven aircraft;

Figure 3:
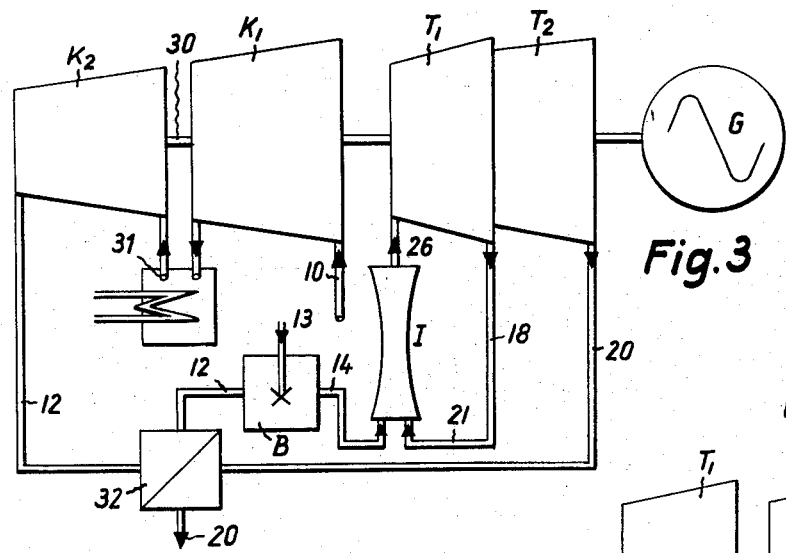
FIGURE 3 illustrates schematically another embodiment of a preferably stationary gas turbine system according to the invention used for driving an electric current generator.

Referring now to the drawings somewhat more in detail and in particular to FIGURES 1 and 1a, reference character K designates the compressor, $T_1$ the medium pressure stage turbine, and $T_2$ the work performing low pressure stage turbine, while I is a pressure equalizing jet nozzle of the type described in my copending patent application supra, and B is a combustion chamber. G is an electric current generator driven by turbine $T_2$. The work medium enters in an open primary cycle from the outside, where it is under a surrounding pressure $p_0$ into the compressor through inlet conduit 10. In the compressor, the work medium, for instance air, is compressed to the maximum pressure $p_1$ of the cycle and passes through conduit 12 to the combustion chamber B of a high pressure stage of the system. Fuel, for instance diesel-oil is injected into the combustion chamber B through injection means 13 and is burnt in this chamber, thereby raising the temperature of the work medium in the chamber to the maximum temperature $T_{max}$ of the process. The heated work medium then passes through conduit 14 into the first section 15 of the pressure equalizing jet nozzle I through the smaller nozzle 16 of the two Laval nozzles 16 and 17 at the pressure $p_1$.

Work medium at the lowest pressure $p_2$ of the medium pressure stage leaves turbine $T_1$ through outlet conduit 18, and part of this work medium at pressure $p_2$ is introduced through conduit 19 into the work performing turbine $T_2$ and released therefrom after expansion through exhaust conduit 20 into the surrounding atmosphere, while another portion of the work medium leaving turbine $T_1$ through conduit 18 is conducted through conduit 21 to the pressure equalizing jet nozzle I and enters the zone 15 thereof through Laval nozzle 17. In zone 15 of the jet nozzle I both work medium currents from conduits 14 and 21 are accelerated to the same common velocity $c_m$, whereupon pressure equalization takes place in radial direction as indicated by arrows A in the pressure equalizing zone 22 of jet nozzle I. This pressure equalizing process is an aperiodic one which does not cause oscillations of the the work performing medium as described more fully in my co-pending application (supra). The combined gas mass then enters a first, supercritical convergent diffusor zone 23 and therefrom to the subcritical divergent diffusor zone 24. At the exit 25 of jet nozzle I the combined gas passes from the primary cycle through conduit 14 and from the secondary cycle through conduits 18 and 21 have the common means pressure $p_m$ at which this combined gas mass is introduced through conduit 26 into turbine $T_1$. Compressor K and turbine $T_1$ are mounted on the same shaft 27, turbine $T_1$ driving the compressor K. The work performing turbine $T_2$ is drivingly connected to the electric current generator G by means of a common shaft 28.

The pressure equalization nozzle I thus performs the equalization of the different states of two gas masses, for instance those entering the jet nozzle I from conduits 14 and 21, to achieve a common medium state without any substantial change of the entropy of the total gas mass. This equalization of the states and consequently of the pressures of such two gas masses shall be explained at the hand of FIGURE 2 of the drawings, which represents an $i$—$s$ diagram in which the ordinate axis indicates enthalpy $i$ and the abscissa indicates entropy $s$. In the Laval nozzles 16 and 17, respectively, the two gas currents are brought to the same supercritical velocity $c_m$ while, simultaneously, pressure $p_1$ of the gas current entering through Laval nozzle 16 decreases to $p_1'$ and pressure $p_2$ of the gas current entering through Laval nozzle 17 decreases to $p_2'$.

In the diagram of FIGURE 2 point U of the cyclic process UVWX indicates the conditions of enthalpy and entropy in conduit 10 at the entrance of compressor K. The pressure at this point is $p_0$. In the compressor K pressure is raised along line U—V to $p_1$. In the combustion chamber B enthalpy of the gas current from the compressor K is increased along the isobar $p_1$. Simultaneously, adiabatic expansion of the work medium in the turbine $T_1$ is illustrated by an arrow from $p_m$ to $p_2$ along line W—X. The part of the work medium at pressure $p_2$ leaving turbine $T_1$ which is further expanded adiabatically in the work performing turbine $T_2$ is brought from pressure $p_2$ to pressure $p_0$, also along the line W—X.

The other portion of the work medium having pressure $p_2$ is introduced into the jet nozzle I and, in zone 15 thereof, this pressure is decreased to pressure $p_2'$, while pressure $p_1$ of the gas current from the combustion chamber B is decreased to pressure $p_1'$ in the zone 15. Both pressure changes take place adiabatically, i.e. line W—X. By the aperiodic pressure equalization in zone 22, the combined gas currents are brought from pressure $p_1'$ and $p_2'$, respectively, to a medium pressure $p_m'$, which, after subsequent diffusion in zones 23 and 24 is raised to the pressure $p_m$ at the exit 25 of the nozzle. At this pressure the combined gas current is introduced into the medium pressure stage turbine $T_1$. The isobar $p_0$ connecting points X and U represents an exchange of work medium through the surrounding atmosphere from the exhaust conduit 20 to the inlet 10.

FIGURE 3 illustrates another embodiment of the gas turbine system of the invention. In this system, there are provided two compressors $K_1$ and $K_2$ mounted on the same shaft 30 and connected via an intermediate cooling device 31. Turbines $T_1$ and $T_2$ are mounted on the same shaft and connected as a compound turbine. Like reference characters otherwise designate like parts as in FIGURE 1; this gas turbine system further comprises a heat exchanger 32 provided in the conduit 12 on the one hand and the exhaust conduit 20 on the other hand, in which exchanger the remaining heat of the exhaust work medium in conduit 20 is exploited for pre-heating work medium passing from the compressor $K_2$ through conduit 12 to the combustion chamber B. This embodiment of FIGURE 3 is of improved efficiency compared with the system of FIGURE 1, due to the fact that the intermediate cooling between compressors $K_1$ and $K_2$ reduces the amount of energy from compressor driving turbine $T_1$, while fuel is saved in the combustion chamber B owing to the utilization of waste work medium in conduit 20 for pre-heating work medium flowing to the combustion chamber.

Figure 4:
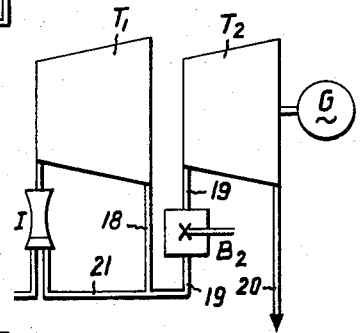
FIGURE 4 is a partial schematical view of a modified arrangement of the gas turbine system illustrated in FIGURE 3.

FIGURE 4 illustrates a further improvement in the gas turbine system shown in FIGURE 1. In this system a second combustion chamber $B_2$ is provided in conduit 19, thereby improving the output of the work performing turbine $T_2$.

Figure 5:
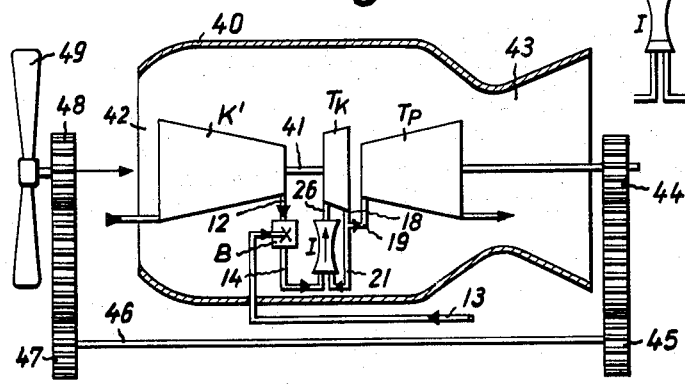
FIGURE 5 shows a gas turbine system according to the invention of the type illustrated in FIGURE 1 and used as propulsion means for a turbo propeller aircraft.

In FIGURE 5 there is illustrated a gas turbine system similar to that of FIGURE 1, but used for driving the propeller of a turbo-prop airplane.

Propeller turbines for aircraft propulsion are described, e.g. in "Die Gasturbine," by J. Kruschik, published by Springer Vienna, Austria, 1952, pages 430 through 454.

In this figure, the gas turbine system of the invention is mounted in an aero-dynamically shaped housing 40 and comprises the compressor K', the compressor turbine $T_k$ and the propeller driving turbine $T_p$ as well as the combustion chamber B and the pressure equalizing jet nozzle I. The compressor K' is mounted on the same shaft 41 as the compressor turbine $T_k$. Through a front opening 42 of housing 40, which opening faces forward in the aircraft, air is introduced into the compressor K' and compressed therein to the pressure $p_1$. The circulation of the working medium, i.e. the air in the gas turbine system has been explained in connection with FIGURE 1. The exhaust working medium leaves the housing 40 coming from the propeller driving turbine $T_p$ through a rearward portion 43 of the housing, which is shaped as a jet nozzle. This nozzle 43 serves as a thrust nozzle. Gear transmission means 44, 45, 46, 47 and 48 serve to drive the propeller 49 from the propeller driving turbine $T_p$.

Figure 6:
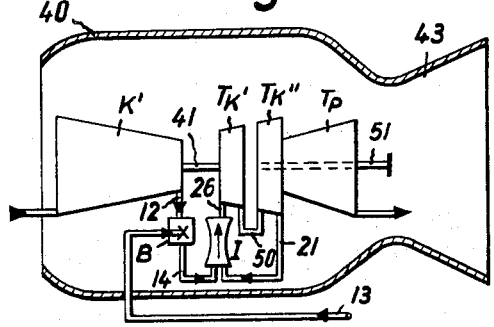
FIGURE 6 shows a somewhat different embodiment of a gas turbine system according to the invention and used in the same manner as in FIGURE 5.

In FIGURE 6 the compressor driving turbine $T_k$ of FIGURE 5 is replaced by divided turbines $T_k'$ and $T_k''$ which are not coupled mechanically with each other. The working medium flows from turbine section $T_k'$ through conduit 50 to turbine section $T_k''$. $T_k''$ is mounted on the same shaft 51 as the propeller driving turbine $T_p$ forming a compound turbine therewith. This embodiment has the advantage over that of FIGURE 5, that the adaptation of the control of the system is better in the case of higher flying velocities and that the distribution of output between the compressor and the propeller driving turbine can be better balanced. In the further embodiment of the gas turbine system used in the same manner as in FIGURES 5 and 6 and illustrated in FIGURE 7, the propeller driving turbine $T_p$ is connected through conduit 60 in parallel with the compressor driving turbine $T_k$ to the pressure equalizing jet nozzle I. This embodiment is particularly suited in cases where the available space for mounting the gas turbine system is limited, due to the fact that the compressor driving turbine $T_k$ is only traversed in the secondary cycle of the working medium.

Furthermore, the output of the propeller turbine is greater because the working medium entering this turbine $T_p$ has a higher pressure than in the embodiments of FIGURES 5 and 6, in which it only has pressure $p_2$.

The embodiments of FIGURES 8 and 9 illustrate a further use of the gas turbine system of the invention, namely in turbo-jet driving systems for aircraft. In these embodiments, the propellers have been replaced by an elongated thrust nozzle 61. In this thrust nozzle the gas which leaves the compressor turbine $T_k$ after partial expansion therein at high velocity is further expanded and accelerated to impart the necessary thrust to the aircraft for propelling the same.

In the embodiment of FIGURE 8 the gas turbine system employed is identical with that shown in FIGURE 5, and in the embodiment of FIGURE 9 this is similar to that shown in FIGURE 7, except, as will be understood from the above, that the propeller driving turbine has been omitted. Furthermore, in FIGURE 9, a secondary combustion means in the form of an after burner 62 is located in the interior of the thrust nozzle 61. Fuel is introduced to both the combustion chamber B and the after burner 62 through a common feed pipe 63. The advantages of the embodiment of FIGURE 9 over that of FIGURE 8 are the same as that of FIGURE 7 over that of FIGURE 5. The thrust achieved in the embodiment of FIGURE 9 is greater than in the embodiment of FIGURE 8.

Figure 11:
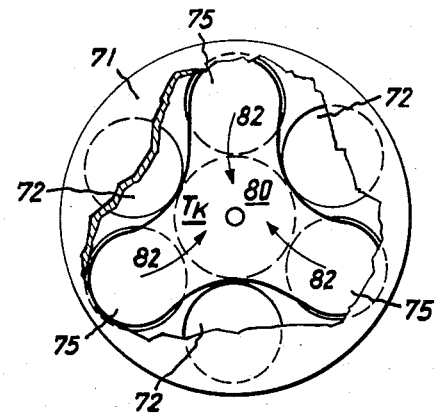
FIGURE 11 is a cross sectional view of the gas turbine shown in FIGURE 10 along line 11—11.

In FIGURES 10 and 11 there is illustrated a gas turbine system and aircraft propeller drive, wherein a plurality of combustion chambers and pressure equalizing jet nozzles are provided in an annular arrangement about the compressor driving turbine. This arrangement comprises the compressor K, compressor driving turbine $T_k$, the propeller driving turbine $T_p$ and the propeller P. Air enters the compressor as indicated by arrows 70 and passes through the compressor and through a multiple conduit head 71 into the combustion chambers 72. The heated working gas passes through connecting tubes 74 into the pressure equalizing jet nozzles 75.

Expanded gas from the exit end (to the right in FIGURE 10) of the compressor driving turbine $T_k$ passes through conduits 76 into Laval nozzle 77 of jet nozzle 75, while connecting pipe 74 ends in Laval nozzle 78. The pressure equalized gas current from the diffusor exit 79 of jet nozzle 75 passes through an interior distributor head 80 into the entrance 81 of turbine $T_k$, as indicated by arrows 82. Turbine $T_k$ and compressor K are mounted on the same shaft 83.

That part of the exhaust gas from turbine $T_k$ which is not introduced in the secondary cycle back into jet nozzles 75 is directed to the entrance end 84 of turbine $T_p$ via conduits 84'. The latter turbine is mounted on separate shaft 85 and actuates propeller P via a transmission comprising gears 86, 87, 88, transmission shaft 89 and propeller drive gears 90, 91 and 92. The latter gear is mounted on the propeller shaft 93. The fully expanded gas leaves the exhaust end of turbine $T_p$ into the surrounding atmosphere as indicated by arrows 94.

Figure 12:
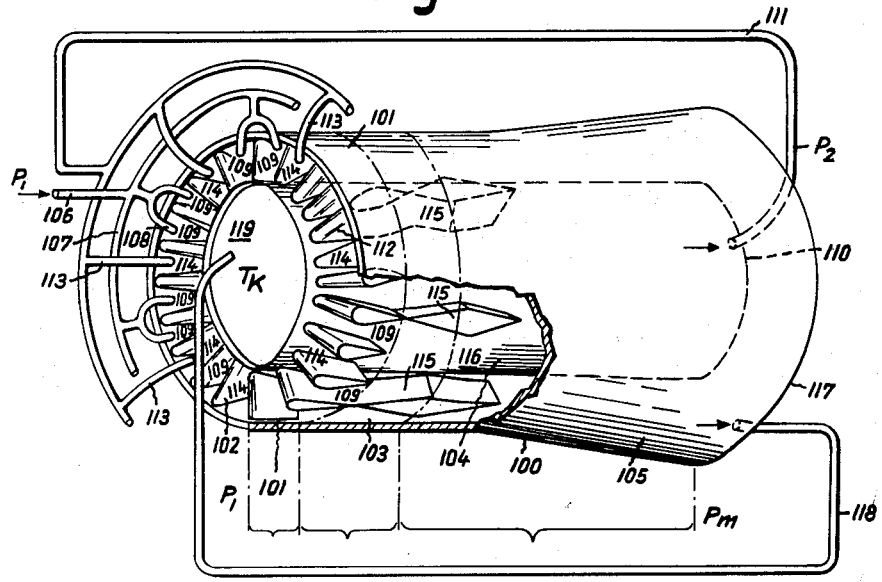
FIGURE 12 illustrates in perspective and partially sectional view a modification of a detailed portion of the system shown in FIG. 10 which detailed portion is a blade ring chamber defining a plurality of pressure equalizing devices annularly arranged around a turbine.

Finally, the embodiment shown in FIGURE 12 comprises an arrangement of a plurality of pressure equalizing devices 100 comprising a ring chamber 101 about and co-centrically with the compressor driving turbine $T_k$. Of course, this turbine may also be arranged adjacent and subsequent or in parallel to the ring chamber 101. The Laval nozzles of the pressure equalizing device 100 are formed by a plurality of blades 102 extending in axial direction over the length of the ring chamber 101 which corresponds to the first zone of the pressure equalizing device in which the work medium coming from the combustion chamber through pipe 106 and ring conduit 107 is introduced through distributing conduits 108 to enter the Laval nozzle spaces 109 at the pressure $p_1$ and is then accelerated to a common velocity which is supercritical for preferably all gas flows. On the other hand, work medium from the exit end 110 of turbine $T_k$ is conducted through pipe 111, ring conduit 112 and distributing conduits 113 into Laval nozzle spaces 114 at the pressure $p_2$. In the annular equalizing chamber 103 intermediate walls 115 of sinoidal shape are provided which subdivide this chamber 103 into sections 116 into each of which there opens one of the Laval nozzle spaces 114 and two adjacent Laval spaces 109. This pressure equalizing chamber 103 corresponds to the chamber 22 in FIGURE 1. At the exit end of this chamber the gas masses from spaces 109 and 114 have attained an equalized pressure $p_m'$. Subsequent to this pressure equalizing chamber 103 there is provided a first annular supercritical diffusor chamber 104. From the exit side 117 of the subcritical diffusor chamber 105 the gas flow now being at the common mean pressure $p_m$ is directed through the necessary conduit means 118 which are only shown schematically, to the entrance 119 of turbine $T_k$.

The pressure equalizing jet nozzle in the gas turbine system according to the invention can be started easily by first suctioning the gas current of lower pressure at supersonic velocity into the Laval nozzles by first introducing thereinto the gas current of higher pressure similar to the operation of a conventional injector. At increasing pressure both gas currents will preferably be accelerated to a common supersonic velocity at the exit of the Laval nozzles. From this instance onward the pressure equalizing device operates in the manner described hereinbefore.

This device may also be started by first introducing the gas current of lower pressure $p_2$ and accelerating the same in its corresponding Laval nozzle to the supersonic exit velocity at the end of the Laval nozzle. Thereafter the gas current with higher pressure $p_1$ is introduced and reaches, in its own Laval nozzle the same exit velocity, which may or may not be supersonic for this current. The necessary auxiliary and control means for starting and controlling the operation of a jet nozzle have been described in my copending patent application supra.

It is an important feature of the invention that the pressure drop from pressure $p_1$, i.e. the maximum pressure in the entire system, to the pressure $p_m$ at which the work medium is introduced into the medium pressure stage turbine so increases the through-put in the turbine or turbine portion in combination with the turbine or turbine portion corresponding to the pressure drop from $p_2$ to $p_0$ yield together the same output as if the normal through-put from the compressor had been expanded in a turbine comprising a pressure drop from the maximum pressure $p_1$ to the minimum pressure $p_0$. This has the advantage that the maximum temperature in the system does not occur at the entrance to the turbine part of the system which is the case in the last mentioned conventional systems in which the turbine comprises the entire expansion from $p_1$ to $p_0$. In the system according to the invention, the temperature of the work medium entering the turbine part thereof is not the maximum temperature but only that temperature of the work medium prevailing after the expansion of the latter from $p_1$ to $p_m$.

The present invention therefore makes it possible to determine the work medium temperature of the entire process by suitably selecting the pressure condition over a wide range and without altering the degree of efficiency of the entire system.

Another advantage of the gas turbine system according to the invention resides in the fact that the favorable influence of a work medium of high temperature on the efficiency of the thermo-dynamic process in the system is fully preserved while in the power converting machine in the system, i.e. the turbine or turbines, the work medium only has moderate temperatures. Therefore, a particular advantage of the system according to the invention is to be seen in the fact that the highest temperatures of the work medium only prevail in the entrance part of the pressure equalizing device, while the work medium temperature at the entrance to the turbine stages is lower than these highest temperatures. Consequently, it was in many cases unnecessary to employ materials of special heat resistance for the construction of the turbines and in particular for the rotary parts thereof.

In spite of the simple and relatively unexpensive construction of the gas turbine system according to the invention a high output can be achieved which corresponds to a relatively high degree of efficiency, for instance in the order of 20 to 30% above the degree of efficiency of a comparable conventional gas turbine system. In the conventional systems the degree of efficiency ranges depending on the detail of construction thereof, between 28 to 33%.

Due to the aforesaid reasons, the gas turbine system according to my invention is particularly suited for aircraft propulsion. In aircraft construction, the weight of the prevailing system is of decisive importance, the propelling system being meant to comprise the weight of the propelling machine plus the weight of the fuel required for a determined flying range of the aircraft and over long distances the weight of this fuel is many times greater than that of the propelling machine. Consequently, in long distance flights, the specific weight/output ratio of the machine is of less importance than the specific fuel consumption per unit of flying range. A decrease of the specific fuel consumption which is achieved by the gas turbine system of my invention therefore leads to a smaller weight of the overall propelling system although it may somewhat increase the weight-output ratio of the propelling machine proper. Even though the machine in the system according to my invention may be a little heavier by yielding the same output as the conventional machine, the fact that its efficiency is greater and therefore that it requires less fuel per flying range unit permits, for the same fuel weight as in the corresponding conventional machine, a considerable extension of the flying range.

Another very important advantage of my invention will become clear from the following: turbo drives surpass piston drives by their simpler construction, reduced head resistance and increased output over a piston drive of the same weight. On the other hand, the specific fuel consumption of turbo drives is considerably higher. A decrease of this high fuel consumption can only be achieved by raising the gas temperature. For the reasons set forth hereinbefore this was not hitherto possible with the presently known materials.

This desirable increase in temperature is now admissible in the gas turbine system according to my invention and makes it possible to use the known ceramic and sintered materials which exclusively support the highest temperatures thus far achievable, because these highest temperatures occur in the system of my invention only in stationary parts which can be easily built from these materials. The rotary elements of my system are only subjected to temperatures at which the best presently known materials for such parts are fully satisfactory. Turbo drives comprising the gas turbine system according to my invention therefore can be operated at the lowest presently attainable fuel consumption rate without sacrificing operational safety of the presently available materials.

It will be understood that this invention is susceptible to modification in order to adapt it to different usages and conditions, and, accordingly, it is desired to comprehend such modifications within this invention as may fall within the scope of the appended claims.

What I claim is:

1. A gas turbine power plant comprising, in combination, an air compressor, a combustion chamber connected to receive air from said compressor for producing a high pressure working medium, a high pressure turbine for expanding said working medium, a low pressure turbine connected to receive a first portion of the expanded working medium from said high pressure turbine, a pressure equalizing device having two inlets and comprising a Laval nozzle means, a first conduit connecting said combustion chamber and one of said inlets, a second conduit connecting said high pressure turbine and the other one of said inlets, said Laval nozzle means communicating with said inlets for accelerating high pressure working medium leaving said combustion chamber through said first conduit and a second portion of said expanded working medium leaving said high pressure turbine through said second conduit, to a common velocity which is supercritical for at least one of said working mediums, said pressure equalizer device further including pressure equalizing zone means of at least partially sinoidal wall formation and disposed downstream of said Laval nozzle means, and supercritical and subcritical diffusor means arranged downstream of said pressure equalizing zone means, and third conduit means connected to feed the working mediums combined in said pressure equalizing device and leaving said diffusor means into said high pressure turbine.

2. In a turbo-jet drive for aircrafts having a propeller and an aircraft jet nozzle, a power plant interposed between the propeller and the jet nozzle and comprising: an air compressor disposed adjacent the propeller, combustion chamber means connected to receive air from said compressor for producing a high pressure working medium, a high pressure turbine for expanding said working medium, a low pressure turbine connected to receive a first portion of the expanding working medium from said high pressure turbine, a pressure equalizing device comprising a first and a second plurality of Laval nozzles annularly arranged around the axis of said high pressure turbine, first conduit means connected for feeding high pressure working medium leaving said combustion chamber means to said first plurality of Laval nozzles, second conduit means connected for feeding a second portion of the expanded working medium leaving said high pressure turbine to said second plurality of Laval nozzles, all of said Laval nozzles accelerating all of the entering working medium to a common velocity which is supercritical for at least one of said high pressure working medium and expanded working medium, a plurality of pressure equalizing jet nozzles, disposed annularly about said axis of said high pressure turbine, each pressure equalizing jet nozzle communicating with one nozzle of said first plurality of Laval nozzles and one nozzle of said second plurality of Laval nozzles, said jet nozzles being arranged downstream of said Laval nozzles, each pressure equalizing jet nozzle having a variable cross section which so decreases in the direction of flow of said work medium that the pressure is equalized aperiodically without causing oscillations of the work medium in said pressure equalizing jet nozzles and that the velocities of said work mediums remain constant therein, each pressure equalizing jet nozzle further including diffusor means arranged downstream therein, in which the kinetic energy of the total mass of said working mediums increases the common mean pressure thereof, and third conduit means connected for feeding working medium leaving said diffusor means of said pressure equalizing jet nozzles to said high pressure turbine.

3. In a turbo-jet drive having a power plant as set forth in claim 2, wherein said pressure equalizing jet nozzles have approximately rectangular cross-sections.

References Cited in the file of this patent

UNITED STATES PATENTS

| 968,724 | Wilstam | Aug. 30, 1910 |
| 2,095,991 | Lysholm | Oct. 19, 1937 |
| 2,195,025 | Couzinet | Mar. 26, 1940 |
| 2,502,878 | Newcombe | Apr. 4, 1950 |
| 2,621,475 | Loy | Dec. 16, 1952 |
| 2,629,982 | Hooker | Mar. 3, 1953 |
| 2,722,372 | Edwards | Nov. 1, 1955 |
| 2,747,790 | Schnitz | May 29, 1956 |

FOREIGN PATENTS

| 870,781 | Germany | Mar. 16, 1953 |
| 605,003 | Great Britain | July 14, 1948 |
| 200,437 | Switzerland | Dec. 16, 1938 |
| 248,608 | Switzerland | Mar. 1, 1948 |